United States Patent Office 3,415,795
Patented Dec. 10, 1968

3,415,795
ANIONIC POLYMERIZATION OF CERTAIN VINYL MONOMERS WITH A METHYLSULFINYLCARBANION CATALYST IN A DIMETHYLSULFOXIDE SOLVENT
Gunther E. Molau, Midland, and Jerry E. Mason, Mount Pleasant, Mich., assignors to The Dow Chemical Company, Midland, Mich., a corporation of Delaware
No Drawing. Filed Dec. 27, 1965, Ser. No. 516,700
8 Claims. (Cl. 260—79.3)

ABSTRACT OF THE DISCLOSURE

A method for the anionic polymerization of vinyl monomers in the presence of a catalyst-initiator comprising methylsulfinylcarbanion containing a sufficient quantity of triphenylmethyl anion to impart a deep red indicator color to the catalyst solution, sufficient catalyst being added such that the red indicator persists, said polymerization occuring in a dimethylsulfoxide solvent.

This invention relates to a method for the anionic polymerization of certain vinyl monomers.

The solubility of various monomers and polymers in the solvents usually employed in anionic polymerization such as hexane, benzene, and tetrahydrofuran is quite limited. For this reason, anionic polymerization of these monomers in the conventional solvents is either difficult or impossible. If solvents of higher polarity and high dielectric constants could be utilized as reaction media for anionic polymerization, the range of anionically polymerizable monomers could be extended to cover even such compounds as sodium styrene sulfonate, heretofore considered impractical to polymerize anionically. Further, polymerization of monomers such as acrylonitrile could be carried out under anionic conditions without precipitation of the polymer product from the reaction medium or solvent.

According to this invention dimethylsulfoxide is employed as a solvent in the polymerization of a vinyl monomer of the general formula:

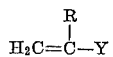

wherein R is H or methyl group, Y is H, $CO_2R'$, CN,

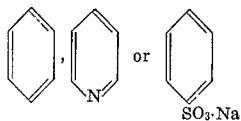

and R' is a lower alkyl group, in the presence of a catalyst or initiator comprising the methylsulfinylcarbanion, hereinafter referred to as "dimsyl anion".

Typical vinyl monomers which can be used in the practice of this invention include styrene, sodium styrene sulfonate, vinyl cyanide (acrylonitrile), methylmethacrylate, and 4-vinyl pyridine.

The dimsyl anion initiator which may be designated by the following formula:

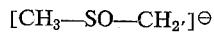

is obtained by reacting sodium hydride with dimethylsulfoxide.

The monomer concentration in the dimethylsulfoxide solvent or reaction medium can range from about 2 to 80 weight percent of the total mixture, however preferred concentration is from about 15 to about 50 weight percent.

The anionic polymerization reaction can be carried out at a reaction temperature between about 18° C. and about 100° C., i.e., corresponding substantially to the melting point and the temperature of incipient decomposition, respectively, of the dimethylsulfoxide solvent. Further, the polymerization can be carried out at a pressure corresponding substantially to the vapor pressure of the reaction mixture.

In practice, the aforementioned monomer is added with stirring to the dimethylsulfoxide solvent or reaction medium containing the catalyst-initiator at room temperature or thereabout, preferably in an amount corresponding to a concentration of from about 2 to about 80 percent by weight of the monomer, based on the total weight of the mixture, the resulting polymerization being an exothermic reaction.

In an alternative procedure, the monomeric sodium styrene sulfonate was dissolved in the solvent and then the dimsyl anion catalyst-initiator was added.

In practicing this invention, the catalyst-initiator is given an indicator color to determine if the catalyst is still active and if any impurities contained in the solvent or in the monomer have been destroyed. This is done in first preparing the catalyst, by replacing a small portion of the dimsyl anion with triphenylmethyl anion by the addition of some triphenylmethane to the catalyst solution. A deep red color, owing to the formation of the triphenylmethyl anion, is produced.

To destroy any impurities initially present in the solvent as well as any that might be present in the monomer, enough catalyst solution is added until the red color persists.

After the anionic polymerization reaction, the catalyst-initiator is destroyed with ethanol and the polymer product precipitated with either methanol or distilled water. The polymer is then extracted and dried in vacuo to obtain the product as a low molecular weight polymer. Although the foregoing was essentially the procedure followed in the laboratory, the destruction of the catalyst and the precipitation of the polymer can be carried out simultaneously. For this purpose highly polar materials such as alcohols, carboxylic acids, or water may be used.

The following examples serve to illustrate our invention. It is, however, to be understood that our invention is in no way limited by these examples.

EXAMPLE I

Preparation of dimsyl anion

Into a nitrogen-purged, dry system was introduced 6.7 g. NaH (56% NaH dispersed in mineral oil), 6.0 g. triphenyl methane and 560 g. dimethylsulfoxide. The mixture was stirred for four hours. A deep red color was produced owing to the formation of triphenyl methyl anion. The triphenyl methane was used as an indicator to determine if the catalyst was still active. After setting overnight in the reaction vessel, under a nitrogen atmosphere to allow the product gases to dissipate, the catalyst solution was transferred under $N_2$ into 100 ml. rubber-stoppered serum bottles.

EXAMPLE II

Polymerization of styrene

Dimethylsulfoxide (300 g.) was placed at room temperature in a nitrogen-purged 2-liter round bottom flask, equipped with stirrer, condenser, and two dropping funnels. From one of the dropping funnels, the dimsyl anion catalyst-initiator was allowed to drip slowly into the dimethylsulfoxide solvent until a red color persisted. At this point, the styrene monomer was added slowly to the stirred solution from the second funnel. Whenever the indicator color faded because of impurities in the monomer which destroyed the dimsyl anion, more catalyst was added until the red color remained. An hour after the styrene (272 g.) was added, the reaction mixture deepened in color and the flask became hot. When the reaction mixture started to cool, the catalyst was destroyed with ethanol. The polymeric solution was then poured into distilled water, the polymer precipitated, and then extracted three times with quart aliquots of ethylene dichloride. After drying in vacuo under low heat, a low molecular weight polymer product was obtained (251 g.).

In a second run, 200 g. of styrene monomer and 300 g. of dimethylsulfoxide solvent together with dimsyl anion catalyst in such amount as to cause a deep red color to persist were heated to 50° C. and polymerized. After the reaction was completed the catalyst was destroyed with ethanol and the polymeric solution was poured into distilled water. The supernatant fluid was decanted and discarded and the polymer precipitate dissolved in benzene. The benzene solution and the water were separated in a separatory funnel. The remaining solution was further dried with anhydrous calcium chloride. The polymeric material was twice precipitated from benzene solution with hexane and dried overnight at 65° C. under vacuum. An infrared curve was made which confirmed that polystyrene (87 g.) had been obtained. The ebullioscopic number average molecular weight of the polymer product in methyl ethyl ketone was 355.

EXAMPLE III

Polymerization of sodium styrene sulfonate

In a procedure slightly different from Example II, the crystalline monomer (59 g.) was dissolved at room temperature in dimethylsulfoxide solvent (300 g.) and the dimsyl anion catalyst was added dropwise to the mixture until a red color persisted. Within two minutes an exothermic reaction occurred which resulted in a temperature rise of 25° C. The temperature then slowly returned to room temperature. The catalyst was destroyed with ethanol, and the polymer (39 g.) precipitated with methanol. By measuring solution viscosity, the average molecular weight was determined to be approximately 20,000.

EXAMPLE IV

Polymerization of vinyl cyanide

Following substantially the same procedure as Example II, the monomer (180 g.) was added dropwise to the dimethylsulfoxide (300 g.) solution of the dimsyl anion. A strong exothermic reaction occurred and at one point the monomer addition had to be stopped because the temperature of the mixture was rising too rapidly (up to 65° C.). When all of the vinyl cyanide had been added, the mixture was allowed to react for an hour longer before the catalyst was destroyed with ethanol. Precipitation of the polymer with water produced a yellowish material which did not remain soluble. The polymer (170 g.) had apparently cross-linked when the reaction mixture reached this high temperature.

In another run, held at or about room temperature, a yellowish polymer was obtained which remained soluble even after precipitation indicating that no significant cross-linking occurred.

EXAMPLE V

Polymerization of methylmethacrylate

An exothermic reaction resulted when the monomer (200 g.) was added dropwise to the dimethylsulfoxide (300 g.) solution of dimsyl anion but at no time did the temperature rise above 40° C. After the mixture reacted for an hour, ethanol was added to destroy the catalyst. The polymer was easily precipitated with water, redissolved in methyl ethyl ketone, and reprecipitated with hexane. The polymer was dried under vacuum at 50° C. There was 96 g. of dry polymer product. An infrared spectrum confirmed that the polymer was polymethylmethacrylate. The ebullioscopic number average molecular weight of the polymer in methyl ethyl ketone was 3,800, and by osmotic pressure in toluene it was 6,000.

EXAMPLE VI

Polymerization of 4-vinylpyridine 200 g. of monomer was added dropwise to the stirred solution of the dimsyl anion-dimethylsulfoxide (300 g.). An exothermic reaction resulted and the temperature of the mixture reached 35° C. After reacting for an hour, the catalyst was destroyed with ethanol and the polymer was precipitated with water. The polymer was then dissolved in dimethylformamide and reprecipitated with distilled water, three times. To remove the water, the polymer was dissolved in methanol and precipitated with 50—50 mixture by weight of benzene in hexane. The polymer was dried overnight at 50° C. under vacuum. There was obtained 81 g. of polymer product. A solubility check showed the polymer to be soluble in dimethylformamide and methanol, and insoluble in methyl ethyl ketone, hexane and benzene. An infrared spectrum confirmed that the polymer was polyvinylpyridine. The ebullioscopic number average molecular weight of the polymer in chloroform was 3,100 and by osmotic pressure in toluene it was 3,500.

What we claim and desire to secure by Letters Patent is:

1. A method for the anionic polymerization of vinyl monomers having the general formula:

$$H_2C=\overset{R}{\underset{|}{C}}-Y$$

wherein R is H or methyl group Y is H, $CO_2R'$, CN,

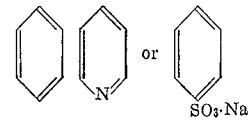

and R' is a lower alkyl group, which method comprises; contacting, in dimethylsulfoxide solvent at reaction temperatures between 18° C. and 100° C., the said vinyl monomer with a catalyst-initiator comprising methylsulfinylcarbanion containing a sufficient quantity of triphenylmethyl anion to impart a deep red indicator color to the catalyst solution, sufficient catalyst being added such that the red indicator color persists; the vinyl monomer being present in an amount corresponding to a concentration of from about 2 to about 80 percent by weight of the monomer based on the weight of the mixture.

2. A method according to claim 1, wherein the vinyl monomer is styrene.

3. A method according to claim 1, wherein the vinyl monomer is sodium styrene sulfonate.

4. A method according to claim 1, wherein the vinyl monomer is vinyl cyanide.

5. A method according to claim 1, wherein the vinyl monomer is methylmethacrylate.

6. A method according to claim 1, wherein the vinyl monomer is 4-vinylpyridine.

7. A method according to claim 1, wherein the vinyl monomer concentration is from about 15 to about 50 percent by weight of the monomer based on the weight of the mixture.

8. A method according to claim 1, wherein ethanol is added to said mixture at the completion of the reaction to destroy the catalyst, followed by the addition of methanol or water to precipitate the polymer therefrom.

No references cited.

JOSEPH L. SCHOFER, Primary Examiner.

H. WONG, Assistant Examiner.

U.S. Cl. X.R.

260—93.5, 88.7, 89.5, 88.3, 30.8